US 6,611,870 B1

(12) United States Patent
Asano et al.

(10) Patent No.: US 6,611,870 B1
(45) Date of Patent: Aug. 26, 2003

(54) SERVER DEVICE AND COMMUNICATION CONNECTION SCHEME USING NETWORK INTERFACE PROCESSORS

(75) Inventors: Shigehiro Asano, Kanagawa (JP); Tatsunori Kanai, Kanagawa (JP); Shinichi Kanno, Kanagawa (JP); Seiji Maeda, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/136,513

(22) Filed: Aug. 19, 1998

(30) Foreign Application Priority Data

Aug. 19, 1997 (JP) .......................... PO9-222105

(51) Int. Cl.⁷ .................... G06F 15/16; G06F 15/173
(52) U.S. Cl. ...................... 709/238; 709/250
(58) Field of Search ................ 709/238, 239, 709/240, 241, 242, 243, 244, 250

(56) References Cited

U.S. PATENT DOCUMENTS

| | | | | |
|---|---|---|---|---|
| 5,603,051 A | | 2/1997 | Ezzet | |
| 5,864,679 A | * | 1/1999 | Kanai et al. | 395/200.68 |
| 5,915,097 A | * | 6/1999 | Chao | 395/200.68 |
| 5,951,649 A | * | 9/1999 | Dobbins et al. | 709/238 |
| 6,085,238 A | * | 7/2000 | Yuasa et al. | 709/223 |
| 6,163,772 A | * | 12/2000 | Kramer et al. | 705/79 |
| 6,253,027 B1 | * | 6/2001 | Weber et al. | 386/287 |

* cited by examiner

*Primary Examiner*—Glenton B. Burgess
*Assistant Examiner*—Tod Kupstas
(74) *Attorney, Agent, or Firm*—Oblon, Spivak, McClelland, Maier & Neustadt, P.C.

(57) ABSTRACT

A server device and a communication connection scheme capable of expanding the memory bandwidth and thereby expanding the power to transmit Web data to the network are disclosed. Network cards are detachably attached to a host machine (main machine). Each network card contains a processor, a memory, and a network interface unit, where data are transmitted to the network from a memory on the network card and the memory bandwidth expansion is realized by the presence of a plurality of network cards. In addition, using a memory of the network card as a cache, the load on the host machine is reduced by transmitting data from this memory to the network when the data exists on the memory and a certain condition is satisfied.

25 Claims, 6 Drawing Sheets

SERVER DEVICE AND COMMUNICATION CONNECTION SCHEME USING NETWORK INTERFACE PROCESSORS

BACKGROUND OF THE INVENTION

1. Field of the Invention

The present invention relates to a server device and a communication connection scheme suitable for a Web server.

2. Description of the Background Art

In conjunction with the rapid progress of information sharing utilizing the World Wide Web, the amount of data outputted from a Web server to a network has been increasing. Conventionally, a Web server often consists of a general purpose computer such as workstation or PC.

The main function of a Web server is to convert the contents of a file stored in a memory device, such as a disk device, into a prescribed format and outputting it to the network. This function largely relies on a program for moving data within memory rather than on computations by a processor. Also, in general the amount of data handled by a Web server is far larger than that of the cache memory of a processor, so that the data cannot be accommodated within the cache memory of a processor.

In view of these factors, the realization of a Web server by a general purpose computer relies on data transfer power, so that it is impossible to realize sufficient performance when the memory bandwidth is small. Consequently, in order to realize sufficient Web server performance, it is essential to expand the memory bandwidth.

However it has been practically difficult to expand the memory bandwidth of such a general purpose computer because the memory bandwidth in such a general purpose computer is determined by the number of pins, which dictates how much data can be read out in parallel in the memory (usually implemented in the form of SIMM (Single In-line Memory Module) connected to a memory controller). The number of pins in the memory controller is limited so that it has been difficult from a viewpoint of cost to increase the size of data that can be read out in parallel by modifying the number of pins.

On the other hand, in order to expand the memory bandwidth, methods exist for providing a plurality of servers on the network. However, according to these methods, it is necessary to provide a plurality of server machines so that the cost also increases. Also, the load distribution among Web servers provided on the network is not preferable, since it leads to the degradation of system performance, due to the traffic required for the purpose of the load distribution on the network.

SUMMARY OF THE INVENTION

It is therefore an object of the present invention to provide a server device and a communication connection scheme capable of expanding the memory bandwidth and thereby expanding the power to transmit Web data to the network by adding some hardware to a general purpose computer.

According to one aspect of the present invention there is provided a server device, comprising: a main machine having a main processor for controlling the main machine, and a main memory for storing server data; and a plurality of network interface processor units connected to the main machine, each network interface processor unit having a local processor for controlling each network interface processor unit independently from the main machine, a local memory for storing a part of the server data, and a local network controller for communicating with an external device through a network, wherein the local processor controls the local memory and the local network controller such that a data requested by the external device is transmitted to the external device from the local memory through the local network controller when the requested data is stored in the local memory and a prescribed condition is satisfied, and requests transfer of the requested data to the main machine when the requested data is not stored in the local memory or the prescribed condition is not satisfied such that the requested data read out from the main memory is transmitted to the external device through the local network controller.

According to another aspect of the present invention there is provided a network interface processor device to be connected to a main machine of the server device having a main processor for controlling the main machine and a main memory for storing server data, the network interface processor device comprising: a local processor for controlling each network interface processor unit independently from the main machine; a local memory for storing a part of the server data; and a local network controller for communicating with an external device through a network; wherein the local processor controls the local memory and the local network controller such that a data requested by the external device is transmitted to the external device from the local memory through the local network controller when the requested data is stored in the local memory and a prescribed condition is satisfied, and requests transfer of the requested data to the main machine when the requested data is not stored in the local memory or the prescribed condition is not satisfied such that the requested data read out from the main memory is transmitted to the external device through the local network controller.

According to another aspect of the present invention there is provided a communication method for a server device formed by a main machine having a main processor for controlling the main machine and a main memory for storing server data, and a plurality of network interface processor units connected to the main machine, each network interface processor unit having a local processor for controlling each network interface processor unit independently from the main machine, a local memory, and a local network controller for communicating through a network, the method comprising the steps of: setting up each network interface processor unit by storing a part of the server data in the local memory; transmitting a data requested by an external device to the external device from the local memory through the local network controller when the requested data is stored in the local memory and a prescribed condition is satisfied, at one of the network interface processor units; and requesting transfer of the requested data to the main machine when the requested data is not stored in the local memory or the prescribed condition is not satisfied, and transmitting the requested data read out from the main memory to the external device through the local network controller, at said one of the network interface processor units.

According to another aspect of the present invention there is provided an article of manufacture, comprising: a computer usable medium having computer readable program code means embodied therein for causing a computer to function as a network interface processor device to be connected to a main machine of the server device having a main processor for controlling the main machine and a main memory for storing server data, the network interface processor device having a local processor for controlling each network interface processor unit independently from the main machine, a local memory for storing a part of the server data, and a local network controller for communicating with an external device through a network, the computer readable program code means includes: first computer readable program code means for causing said computer to transmit a data requested by the external device to the external device from the local memory through the local network controller when the requested data is stored in the local memory and a prescribed condition is satisfied; and second computer readable program code means for causing said computer to request transfer of the requested data to the main machine when the requested data is not stored in the local memory or the prescribed condition is not satisfied, and transmit the requested data read out from the main memory to the external device through the local network controller.

According to another aspect of the present invention there is provided an article of manufacture, comprising: a computer usable medium having computer readable program code means embodied therein for causing a computer to function as a main machine of the server device having a main processor for controlling the main machine, a main memory for storing server data, and a main network controller for communicating with an external device through a network, the main machine being connected with a plurality of network interface processor units, each network interface processor unit having a local processor for controlling each network interface processor unit independently from the main machine, a local memory for storing a part of the server data, and a local network controller for communicating with the external device through the network, the computer readable program code means includes: first computer readable program code means for causing said computer to select one network interface processor unit among said plurality of network interface processor units according to a prescribed rule upon accepting a request from the external device through the main network controller, such that the selected network interface processor unit transmits a data requested by the external device to the external device from the local memory through the local network controller when the requested data is stored in the local memory and a prescribed condition is satisfied; and second computer readable program code means for causing said computer to transfer the requested data from the main memory to the selected network interface processor unit when the requested data is not stored in the local memory or the prescribed condition is not satisfied.

Other features and advantages of the present invention will become apparent from the following description taken in conjunction with the accompanying drawings.

DETAILED DESCRIPTION OF THE PREFERRED EMBODIMENTS

Referring now to FIG. 1 to FIG. 7, one embodiment of a server device and a communication connection scheme according to the present invention will be described in detail.

In short, according to the present invention, network cards are detachably attached to a host machine (which will also be referred to as a main machine). Each network card contains a processor, a memory, and at least one network interface unit (also referred to as a network controller in the following description), where data are transmitted to the network from a memory on the network card and the memory bandwidth expansion is realized by the presence of a plurality of network cards.

In addition, using a memory of the network card as a cache, the load on the host machine is reduced by transmitting data from this memory to the network when the data exists on the memory and a certain condition is satisfied. Moreover, when a writing with respect to data in the file system of the host machine is made, this fact is notified to the network card, and if there is a copy of that data on the memory, that data on the memory is invalidated so as to maintain the consistency.

Figure 1:
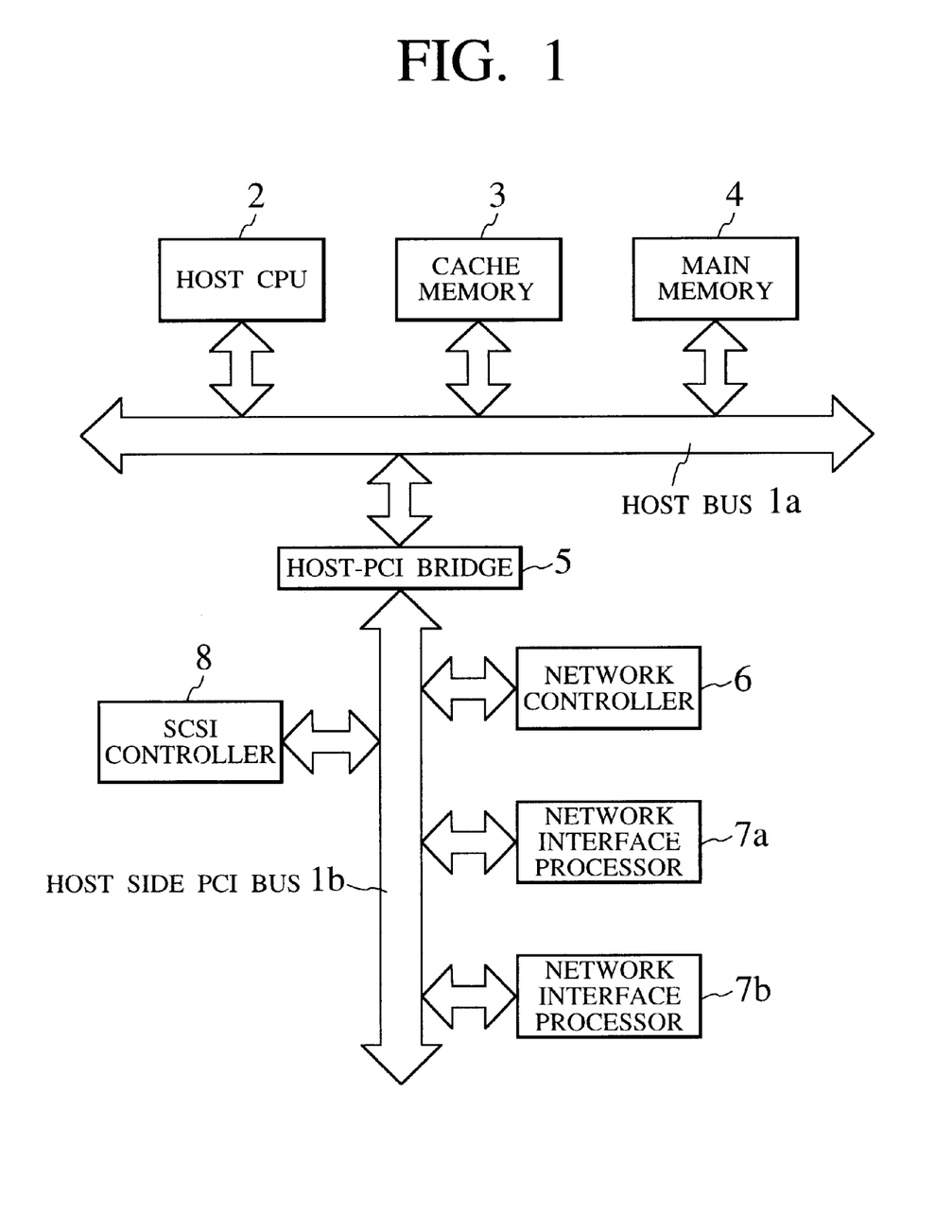
FIG. 1 is a block diagram showing an exemplary configuration of a server device according to one embodiment of the present invention.

FIG. 1 shows an exemplary configuration of a server device according to this embodiment, in which a host CPU 2, a cache memory 3, and a main memory 4 are connected with each other through a host bus 1a. This host bus 1a is also connected with a host side PCI (Peripheral Component Interconnect) bus 1b through a host-PCI bridge 5, where a network controller 6, network interface processors (abbreviated hereafter as NIP whenever convenient) 7a, 7b, . . . , and an SCSI (Small Computer System Interface) controller 8 are connected to this host side PCI bus 1b.

Each network interface processor 7 is provided in a form of a network card to be detachably attached to a host machine in this embodiment.

The network controller 6 is provided in a form of board or card to be installed on the main machine (host machine), for example. Also, in TCP/IP (Transmission Control Protocol/Internet Protocol) for example, this network controller 6 is allocated with an IP (Internet Protocol) address for uniquely identifying each controller.

Note that the PCI buses are used in this embodiment, but the present invention is not necessarily limited to the use of PCI buses and other buses such as VME (Versa Module Europe) buses may be used instead. Also, the PCI bus of the host machine may be further connected with other devices such as network controller board and SCSI board. In addition, the Ethernet is used as a network in this embodiment, but similarly the other network such as those of ATM (Asynchronous Transfer Mode) and FDDI (Fiber Distributed Data Interface) may be used instead.

Figure 2:
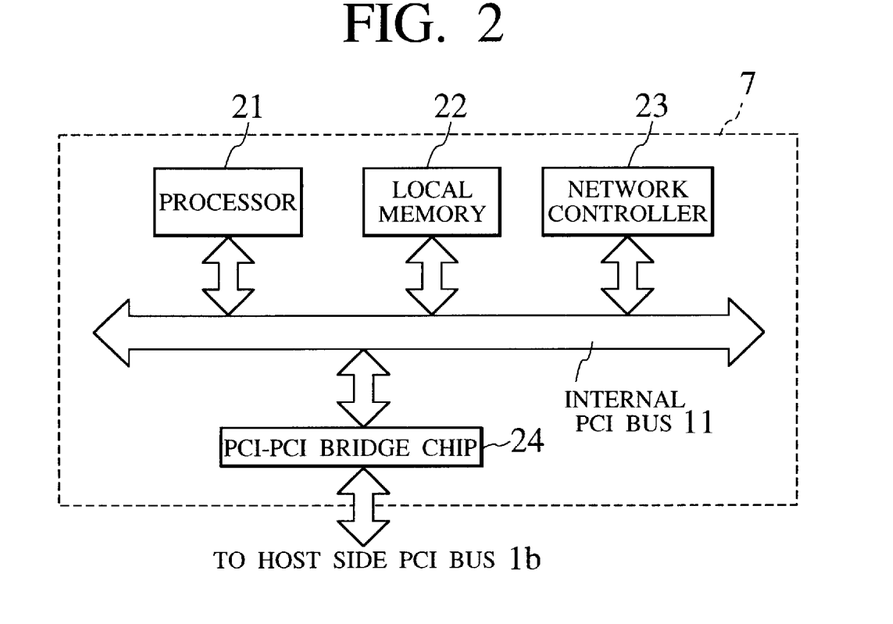
FIG. 2 is a block diagram showing an exemplary internal configuration of a network interface processor in the server device of FIG. 1.

FIG. 2 shows an exemplary internal configuration of the NIP 7, which comprises a processor 21, a local memory 22, a network controller 23, and a PCI—PCI bridge chip 24, all of which are connected through an internal PCI bus 11. This internal PCI bus 11 is also connected to the host side PCI bus 1b of FIG. 1 through the PCI—PCI bridge chip 24. By this PCI—PCI bridge chip 24, the NIP 7 and the host machine are functionally separated so that they can operate without receiving any interferences from each other.

The processor 21 carries out the control of each modules within the NIP 7, independently from the host CPU 2.

The network controller 22 enables communications with external networks, and has equivalent functions as the network controller 6 which is controlled by the host CPU 2.

Figure 3:
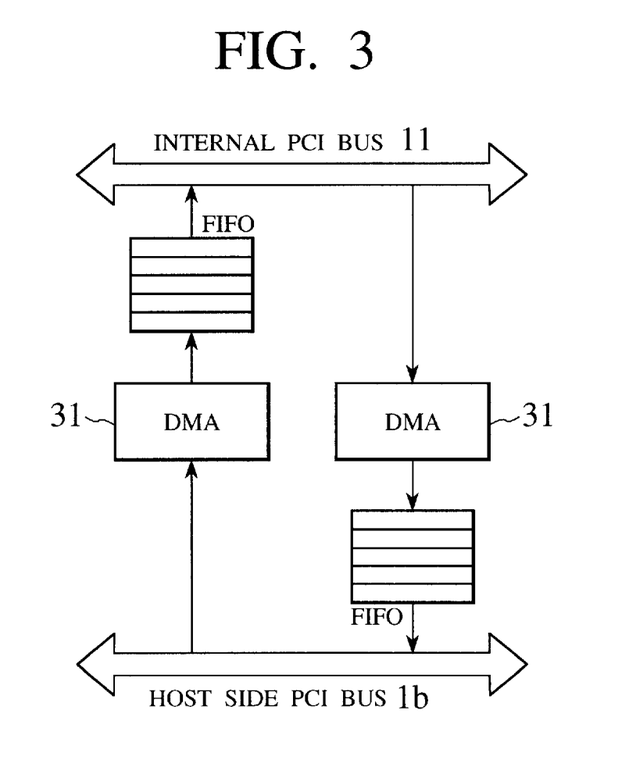
FIG. 3 is a block diagram showing an exemplary internal configuration of a PCI—PCI bridge chip in the network interface processor of FIG. 2.

FIG. 3 shows an exemplary internal configuration of the PCI—PCI bridge chip 24, which has built-in DMA (Direct Memory Access) controllers 31 so that data transfer is possible from either the NIP 7 side or the host machine side by setting data into the DMA controller 31, and outputting data through a FIFO (First-In First-Out) buffer.

Now, the operation of the server device in the above described configuration will be described. Here, an exemplary case of communications with a distant client machine through a network using HTTP (Hyper Text Transfer Protocol) will be described.

A request (access) from the network using HTTP is allocated to the network controller corresponding to a particular default IP address. In this case, it may be allocated to the network controller 23 inside the NIP 7, or to the network controller 6 connected to the host side PCI bus 1b in the host machine. In this embodiment, it is assumed that an initial access (first access) from the client is to be connected to the network controller 6. Note that the first access may be allocated to the network controller 23 of the NIP 7 instead of the network controller 6 if desired.

The network controller 6 transmits the request received from the network to the host CPU 2. The host CPU 2 then carries out the interpretation as described below, and assigns this request to one of the plurality of NIPs using the re-direct function of HTTP.

Figure 4:
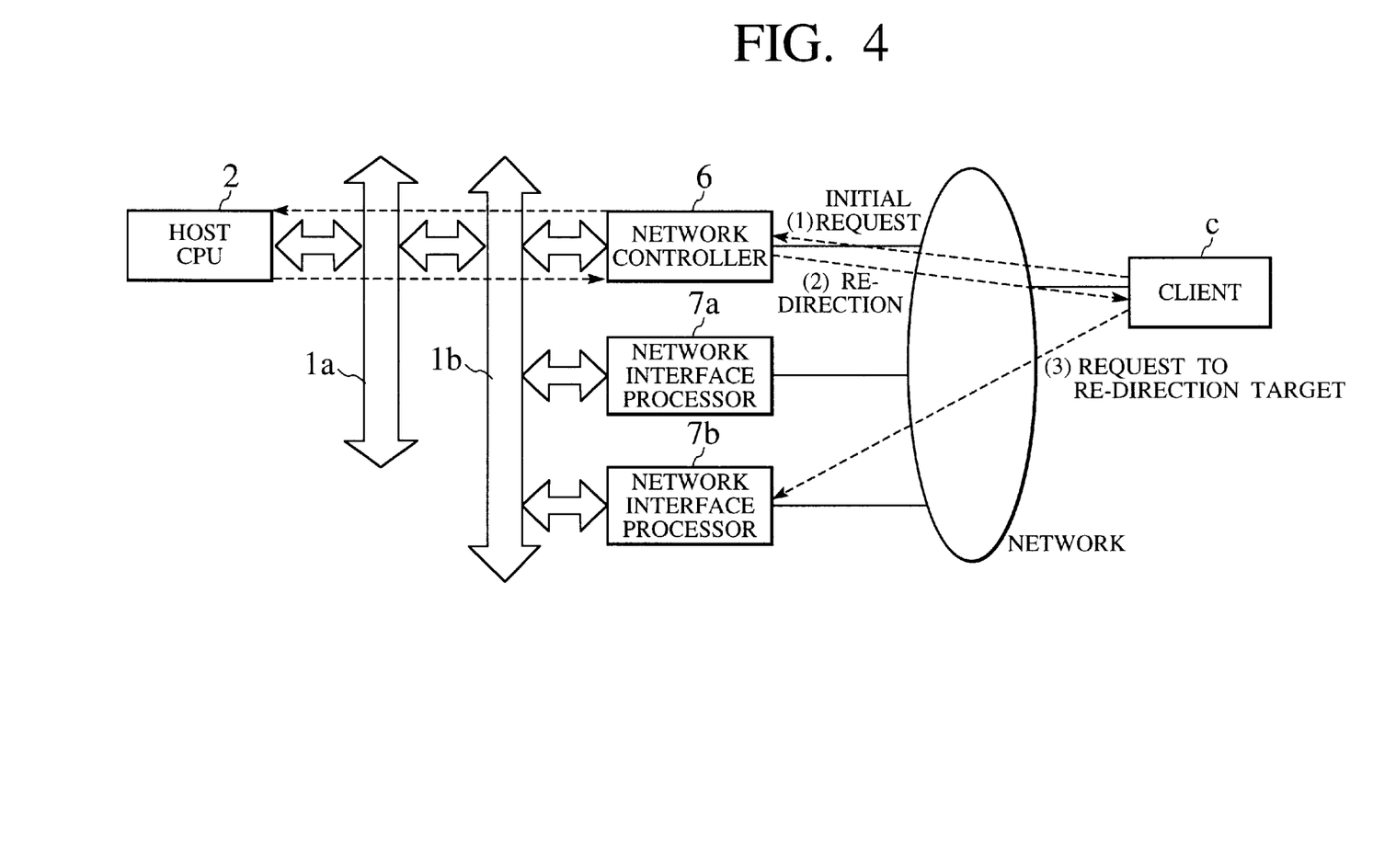
FIG. 4 is a diagram showing a communication sequence between client and server devices for explaining the operation of the server device of FIG. 1.

FIG. 4 shows a communication sequence between the client and server devices. As shown in FIG. 4, the access with respect to an address specified by the client C is connected to the network controller 6 as an initial request ((1) of FIG. 4). The network controller 6 gives this initial request to the host CPU 2, specifies a specific NIP according to a prescribed condition, and returns to the client C a message containing an IP address corresponding to that specific NIP ((2) of FIG. 4). This message contains a re-direct address such as "http://IP address of the specified NIP/p1.html", for example. The client C that received this message then changes its connection target to the re-direct target, and issues a request to the re-directed target ((3) of FIG. 4). By this operation, the request is effectively given to the specific NIP.

As for the selection of one NIP from a plurality of NIPs 7 by the host machine, several methods are available. If only the viewpoint of distributing loads uniformly is adopted, there can be cases where the full advantage of the cache function cannot be taken as different data are cached in different NIPs. Consequently, in the case of using the re-direction, the NIP is selected by the static re-direction first, and the re-direction is carried out by determining an NIP with a lower load when the load of the selected NIP is high.

Here, the strategy for the static re-direction can be determined by using the hash function according to information such as URL (Uniform Resource Locator). For instance, a residue obtained by dividing a sum of character codes of the URL address by the number of NIPs can be used as the hash function.

As for the load of the NIP, an average time since each NIP accepts a request from the network until a response is made in form of a prescribed service is calculated, and using this as an average response time, a notice is given to the host machine at constant interval. The calculation of the average response time can be realized for example by averaging all the response times of the past up to the present since the time of activation, or averaging the last prescribed number of response times. The host machine maintains this average response time for each NIP in correspondence, and recognizes an NIP with the larger average response time as an NIP with the higher load.

Figure 5:
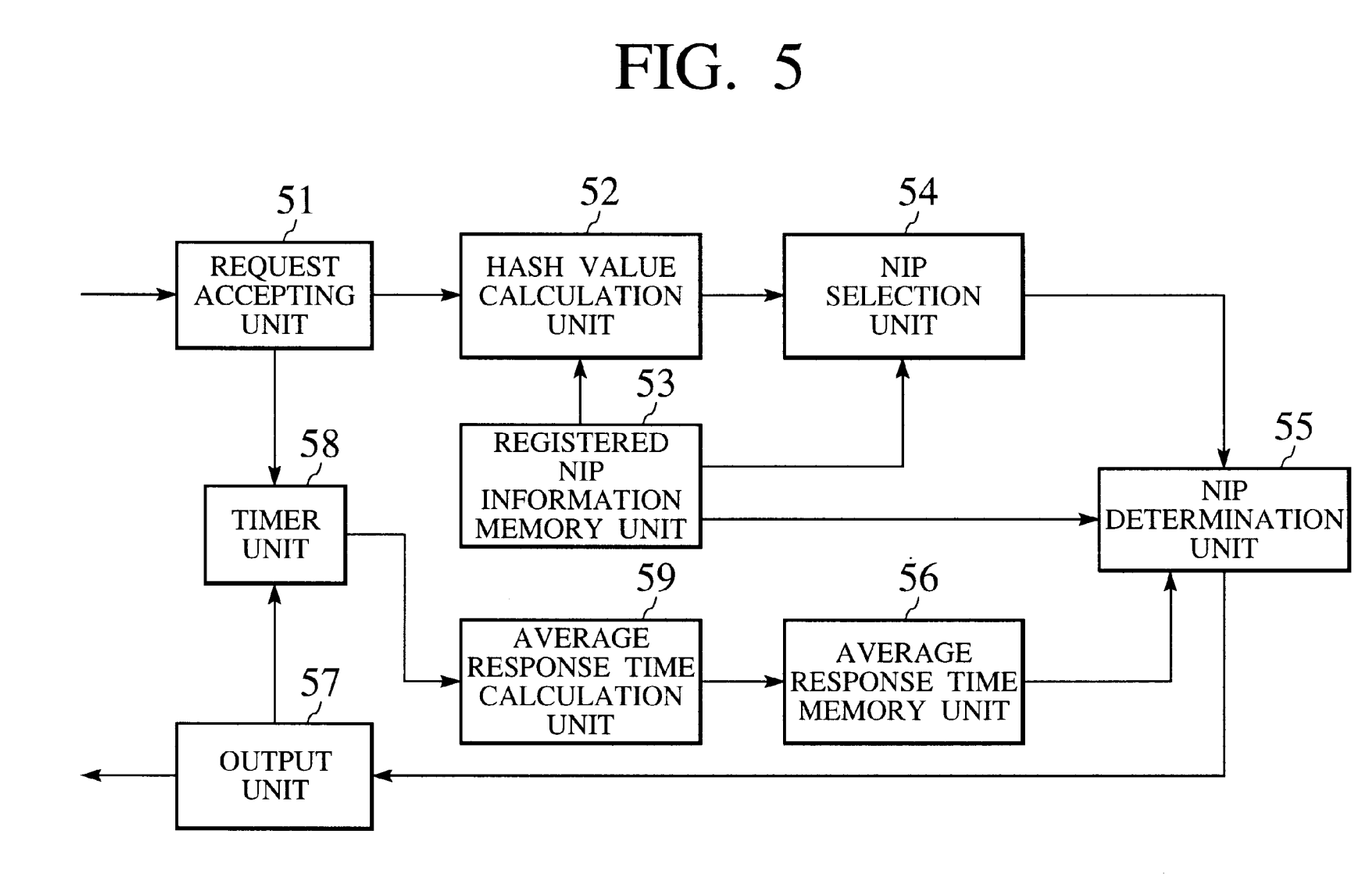
FIG. 5 is a block diagram showing an exemplary configuration of a network controller in the server device of FIG. 1 or the network interface processor of FIG. 2.

FIG. 5 shows an exemplary configuration of software modules executed by the host CPU 2 in conjunction with the network controller 6, in relation to the re-direction function of the server device according to this embodiment.

As described above, the network controller for accepting the first access from the client can be either the network controller 6 inside the host machine or the network controller 23 inside the NIP. Consequently, either network controller operates similarly, and in the following, the re-direction in the exemplary case of accepting the first access at the network controller 6 inside the host machine will be described.

Note that each functional block in the configuration of FIG. 5 can be realized by hardware, software, or their combination.

In the software modules of FIG. 5, a request accepting unit 51 accepts a request from an external device through the network, and sends it to a hash value calculation unit 52. The hash value calculation unit 52 calculates a hash value according to a URL address contained in the received request. At this point, the number of NIPs connected to the server device is obtained from a registered NIP information memory unit 53. The hash value calculated by the hash value calculation unit 52 is sent to an NIP selection unit 54. The NIP selection unit 54 selects one NIP from those registered in the registered NIP information memory unit 53 according to that hash value, and sends an identification information (such as a hardware number) of the selected NIP to an NIP determination unit 55.

The NIP determination unit 55 Judges a load on the selected NIP by referring to an average response time memory unit 56. Here, the NIP determination unit 55 Judges that the selected NIP has a high load when the average response time for that NIP is greater than a prescribed threshold. When it is Judged that the originally selected NIP has a high load, the NIP determination unit 55 newly selects one of NIPs with the load lower than a certain threshold according to the average response time memory unit 56, and obtains an IP address of the newly selected NIP from the registered NIP information memory unit 53. Here, the NIP determination unit 55 may newly select an NIP with the lowest load instead.

On the other hand, when it is Judged that the originally selected NIP has a low load, the NIP determination unit 55 simply obtains an IP address of the originally selected NIP from the registered NIP information memory unit 53.

When the IP address of a re-direction target NIP is obtained in this manner, the NIP determination unit 55 sends it to an output unit 57. The output unit 57 notifies the re-direction target to the request source client.

In the above, the average response time can be generated as follows, for example. Namely, when the request accepting unit 51 accepts the request, this fact is notified to a timer unit 58. The timer unit 58 calls a timer function, for example, and measures an elapsed time (response time) until a response with respect to that request is outputted from the output unit 57. The measured response time is sent to the average response time calculation unit 59.

The average response time calculation unit 59 calculates a new average response time according to the measured response time and the average response time used up until now, and updates the stored content of the average response time memory unit 56 by the calculated new average response time.

Figure 6:
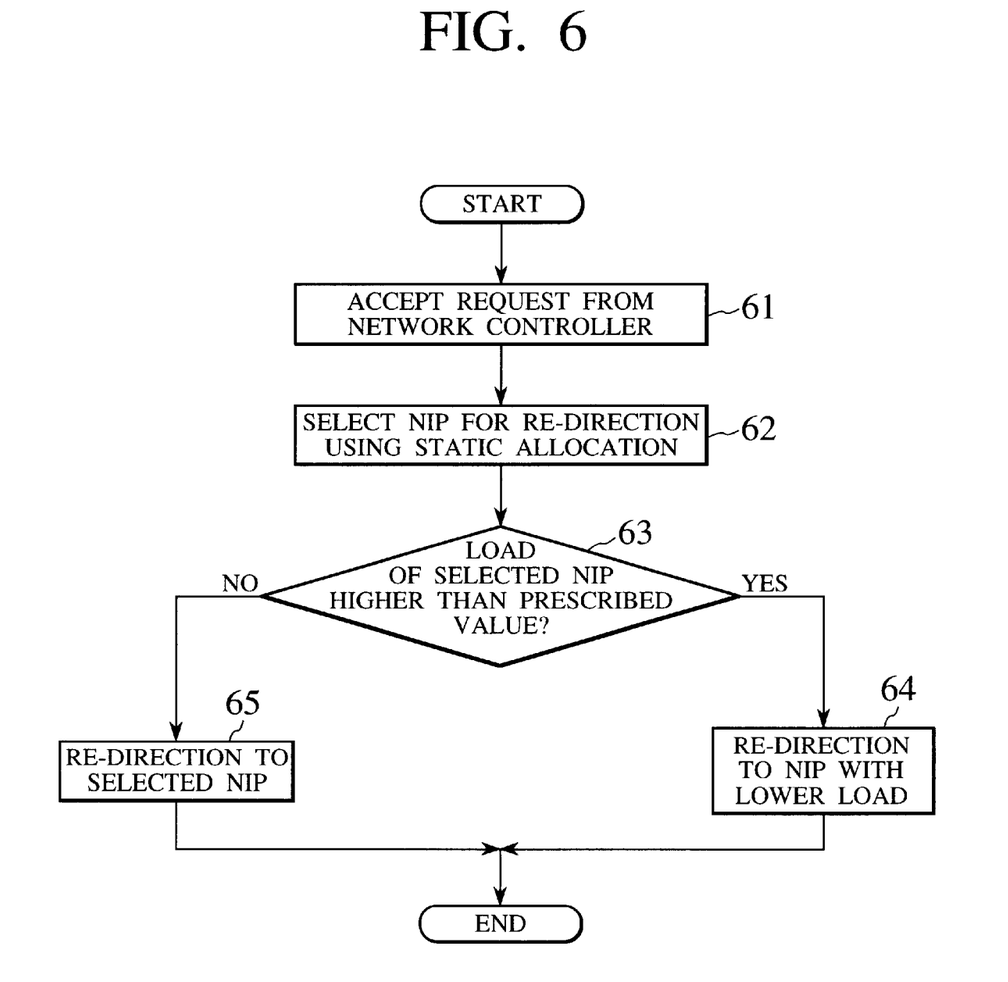
FIG. 6 is a flow chart for the operation of the server device of FIG. 1 to carry out a re-direction.

FIG. 6 is a flow chart for the operation of the server device in this case, which proceeds as follows.

When the request from the network controller is accepted (step 61), an NIP for re-direction (re-direction target) is selected by the static strategy (allocation) (step 62). Then, whether a load (average response time) of the selected NIP is higher than a prescribed threshold or not is judged (step 63). When it is judged that the load is higher, one of NIPs with the load lower than a certain threshold is newly selected and a message containing the IP address of this NIP is returned to the client so as to carry out the re-direction with this newly selected NIP as the re-direction target (step 64). Here, the NIP with the lowest load may be newly selected instead.

On the other hand, when it is judged that the load is not higher, a message containing the IP address of the NIP selected at the step 62 is returned to the client so as to carry out the re-direction with this originally selected NIP as the re-direction target.

Figure 7:
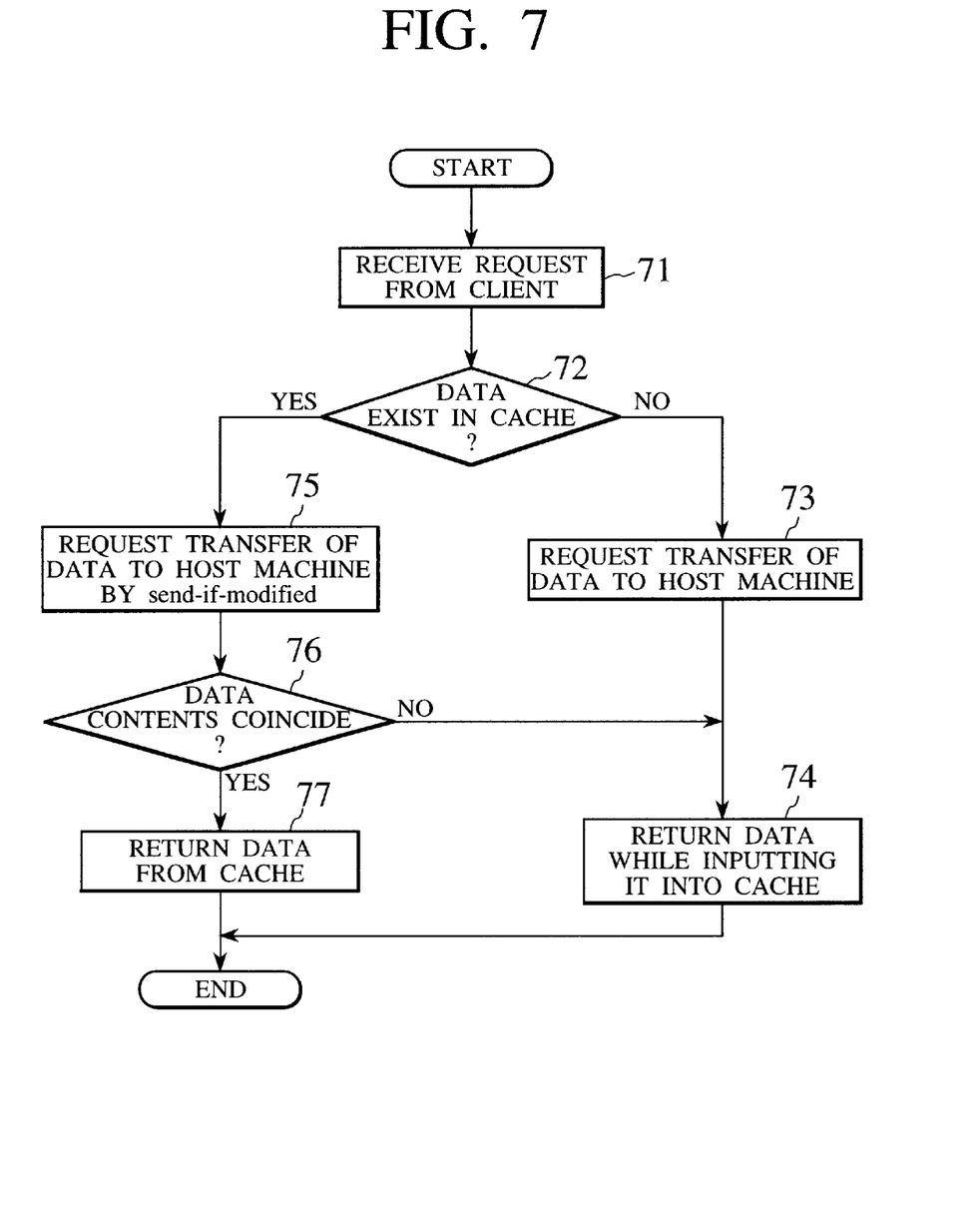
FIG. 7 is a flow chart for the operation of the network interface processor of FIG. 2 that is selected to be a re-direction target.

FIG. 7 is a flow chart for the operation of the NIP that became the re-direction target in this case, which proceeds as follows.

When the request from the client is received (step 71), whether data corresponding to the requested URL exists on the own cache memory (the local memory 22) or not is judged (step 72). When it is judged that the corresponding data does not exist, the transfer of that data is requested to the host machine (step 73), and the data returned from the host machine is outputted to the network from the own network controller 23 while registering it into the local memory 22 that functions as a cache memory (step 74). Here, the NIP may be controlled such that the registration of the data returned from the host machine into the local memory 22 is carried out when the size of the data returned from the host machine is smaller than a certain threshold. In other words, the data returned from the host machine may not necessarily be stored into the local memory 22 and whether or not to store the data returned from the host machine into the local memory 22 can be judged according some condition.

On the other hand, when it is Judged that the corresponding data exists at the step 72, the transfer of that data is requested to the host machine by sending the "send-if-modified" command of HTTP to the host machine (step 75) and whether its contents coincide with the data contents registered in the host machine or not is judged (step 76). If the data contents do not coincide, the new data contents are returned from the host machine so that the data with new data contents is outputted to the network and cached in the local memory 22 (step 74), whereas if the data contents coincide, this fact is notified from the host machine so that the data as cached in the own local memory 22 is outputted to the network (step 77).

Note that the "send-if-modified" command is used in this embodiment, but this may be omitted in the case where an influence due to updating of data registered in the server device is small, and the data may be outputted from the cache memory inside the NIP whenever the data exists in the cache memory. In such a case, it is preferable to set up a valid period for each cached content and delete each cached content when its valid period is over so as not to keep it cached indefinitely. More specifically, the operation of FIG. 7 may be modified such that, after the step S72 YES in FIG. 7, whether the valid period is over or not is checked, and if it is over, the operation proceeds to the step 74, whereas if it is not over, the operation proceeds to the step 77 by skipping the steps 75 and 76. In this case, the data will be outputted from the cache memory inside the NIP without inquiring the host, whenever the data exists in the cache memory and its content is fresh (a day has not elapsed since it is registered, for example).

Note also that the network controller is assumed to be connected to a wire network such as Ethernet in this embodiment, but the present invention is not necessarily limited to this and a radio network configuration may be used instead.

As described, according to the present invention, it is possible to expand the processing power of the host machine as the Web server with less hardware resources. Also, the load distribution among a plurality of ports can be realized efficiently. Due to these effects, it becomes possible to expand the processing power of the Web server relatively cheaply.

It is to be noted that the above described embodiment may be modified such that the re-direction using the hash function is used when the load is high whereas the hash function is not used when the load is low.

It is also to be noted that the above described embodiment according to the present invention may be conveniently implemented in forms of software programs for realizing the operations of the server device and the network interface processors, as will be apparent to those skilled in the computer art. Appropriate software coding can readily be prepared by skilled programmers based on the teachings of the present disclosure, as will be apparent to those skilled in the software art. Moreover, such a software program can be provided in a form of a computer program product which employs a storage medium including stored computer code which is used to program a computer to perform the disclosed function and process of the present invention. The storage medium may include, but is not limited to, any type of conventional floppy disks, optical disks, CD-ROMs, magneto-optical disks, ROMs, RAMs, EPROMs, EEPROMs, magnetic or optical cards, or any other suitable media for storing electronic instructions.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A server device, comprising:
   a main machine having a main processor configured to control the main machine, and a main memory configured to store server data; and
   a plurality of network interface processor units connected to the main machine, each network interface processor unit having a local processor configured to control each network interface processor unit independently from the main machine, a local memory configured to store a part of the server data, and a local network controller configured to communicate with an external device through a network, wherein the local processor of one of the plurality of network interface processor units controls the local memory and the local network controller of said one network interface processor unit such that a data requested by the external device is transmitted to the external device directly from the local memory through the local network controller when the requested data is stored in the local memory and a prescribed condition is satisfied, and requests that the main processor transfer the requested data from the main machine to said one network interface processor unit when the requested data is not stored in the local memory or the prescribed condition is not satisfied, such that the requested data read out from the main memory is transmitted to the external device indirectly through the local network controller.

2. The server device of claim 1, wherein the main machine includes:
   a main network controller configured to communicate with the external device through the network;
   a selection unit configured to select one network interface processor unit among said plurality of network interface processor units according to a prescribed rule upon accepting an initial request from the external device through the main network controller; and
   a re-direction unit configured to re-direct the external device to said one network interface processor unit selected by the selection unit so that the external device makes a subsequent request to said one network interface processor unit.

3. The server device of claim 2, wherein the selection unit is configured to select a first network interface processor unit according to the prescribed rule as said one network interface processor unit, and when a load on the first network interface processor unit is higher than a prescribed threshold, to select a second network interface processor unit with a load lower than a second prescribed threshold among said plurality of network interface processor units as said one network interface processor unit.

4. The server device of claim 3, wherein the main machine further includes:
   a calculation unit configured to calculate an average response time of each network interface processor unit and to store the calculated average response time of each network interface processor unit as an information indicating the load on each network interface processor unit.

5. The server device of claim 2, wherein the selection unit is configured to use the prescribed rule based on a static strategy for selecting said one network interface processor unit regardless of a state of said one network interface processor unit.

6. The server device of claim 2, wherein the selection unit is configured to use the prescribed rule to select said one network interface processor unit according to a hash function value based on an address contained in the initial request.

7. The server device of claim 1, wherein the local processor of each network interface processor unit enters the requested data read out from the main memory into the local memory when an entering condition is satisfied.

8. The server device of claim 1, wherein the local processor of each network interface processor unit is configured to independently decide whether the prescribed condition is satisfied or not.

9. The server device of claim 1, wherein the main processor is configured to update the server data in the main memory when a data is written from the network to the main machine, and to notify each network interface processor unit of the updating of the server data.

10. The server device of claim 1, wherein each network interface processor unit is provided in a form of a network card to be detachably attached to the main machine.

11. A network interface processor device to be connected to a main machine of a server device having a main processor configured to control the main machine and a main memory configured to store server data, the network interface processor device comprising:
    a local processor configured to control the network interface processor device independently from the main machine;
    a local memory configured to control a part of the server data; and
    a local network controller configured to communicate with an external device through a network;
    wherein the local processor is configured to control the local memory and the local network controller such that data requested by the external device is transmitted to the external device directly from the local memory through the local network controller when the requested data is stored in the local memory and a prescribed condition is satisfied, and to request the main processor to transfer the requested data from the main machine to the network interface processor device when the requested data is not stored in the local memory or the prescribed condition is not satisfied, such that the requested data read out from the main memory is transmitted to the external device indirectly through the local network controller.

12. The network interface processor device of claim 11, wherein the local processor is configured to enter the requested data read out from the main memory into the local memory when an entering condition is satisfied.

13. The network interface processor device of claim 11, wherein the local processor is configured to independently decide whether the prescribed condition is satisfied or not.

14. The network interface processor device of claim 11, wherein the local processor, the local memory, and the local network controller are collectively provided in a form of a detachable network card to be attached to the main machine.

15. A communication method for a server device formed by a main machine having a main processor for controlling the main machine and a main memory for storing server data, and a plurality of network interface processor units connected to the main machine, each network interface processor unit having a local processor for controlling the respective network interface processor unit independently from the main machine, a local memory, and a local network controller for communicating through a network, the method comprising the steps of:
    setting up each network interface processor unit by storing a part of the server data in the respective local memory of each network interface processor unit;
    transmitting a data requested by an external device to the external device directly from the local memory of one of the plurality of network interface processor units through the corresponding local network controller when the requested data is stored in the local memory of said one network interface processor unit and a prescribed condition is satisfied; and
    requesting the main processor to transfer the requested data from the main machine to said one network interface processor unit when the requested data is not stored in the local memory of said one network interface processor unit or the prescribed condition is not satisfied, and transmitting the requested data read out from the main memory to the external device indirectly through the local network controller of said one network interface processor unit.

16. The method of claim 15, further comprising the steps of:

selecting said one of the network interface processor units among said plurality of network interface processor units according to a prescribed rule at the main machine, upon accepting an initial request from the external device; and re-directing the external device to said one of the network interface processor units selected by the selecting step so that the external device makes a subsequent request to said one network interface processor unit.

17. The method of claim 16, wherein the selecting step first selects a first network interface processor unit according to the prescribed rule as said one of the network interface processor units, and when a load on the first network interface processor unit is higher than a prescribed threshold, selects a second network interface processor unit with a load lower than a second prescribed threshold among said plurality of network interface processor units as said one of the network interface processor units.

18. The method of claim 17, further comprising the steps of:

calculating an average response time of each network interface processor unit, in the main processor; and storing in the main memory the average response time, calculated by the calculating step, of each network interface processor unit as an information indicating the load on each network interface processor unit.

19. The method of claim 16, wherein the selecting step uses the prescribed rule based on a static strategy for selecting said one of the network interface processor units regardless of a state of each network interface processor unit.

20. The method of claim 16, wherein the selecting step uses the prescribed rule which determines said one of the network interface processor units according to a hash function value based on an address contained in the initial request.

21. The method of claim 15, further comprising the step of:

entering the requested data read out from the main memory into the local memory when an entering condition is satisfied, at said one of the network interface processor units.

22. The method of claim 15, wherein at the transmitting step, the local processor of each network interface processor unit independently decides whether the prescribed condition is satisfied or not.

23. The method of claim 15, further comprising the step of:

updating the server data in the main memory when data is written from the network to the main machine, and notifying each network interface processor unit from the main processor of the updating of the server data.

24. A computer program product for causing a computer to function as a network interface processor device connected to a main machine of a server device having a main processor for controlling the main machine and a main memory for storing server data, the network interface processor device having a local processor for controlling the network interface processor device independently from the main machine, a local memory for storing a part of the server data, and a local network controller for communicating with an external device through a network, the computer program product comprising:

a first computer program code configured to cause said computer to transmit data requested by the external device to the external device directly from the local memory through the local network controller when the requested data is stored in the local memory and a prescribed condition is satisfied; and a second computer program code configured to cause said computer to request that the main processor transfer the requested data from the main machine to the network interface processor device when the requested data is not stored in the local memory or the prescribed condition is not satisfied, and to transmit the requested data read out from the main memory to the external device indirectly through the local network controller.

25. A computer program product for causing a computer to function as a main machine of a server device having a main processor for controlling the main machine, a main memory for storing server data, and a main network controller for communicating with an external device through a network, the main machine being connected to a plurality of network interface processor units, each network interface processor unit having a local processor for controlling the respective network interface processor unit independently from the main machine, a local memory for storing a part of the server data, and a local network controller for communicating with the external device through the network, the computer program product comprising:

a first computer program code configured to cause said computer to select one network interface processor unit among said plurality of network interface processor units according to a prescribed rule upon accepting a request from the external device through the main network controller, and to cause the selected network interface processor unit to transmit a data requested by the external device to the external device directly from the local memory of the selected network interface processor unit through the corresponding local network controller when the requested data is stored in the local memory of the selected network interface processor unit and a prescribed condition is satisfied; and a second computer program code configured to cause said computer to transfer the requested data from the main memory to the selected network interface processor unit when the requested data is not stored in the local memory of the selected network interface processor unit or the prescribed condition is not satisfied, and to cause the selected network interface processor unit to transmit the requested data to the external device indirectly through the corresponding local network controller.

* * * * *